(12) United States Patent (10) Patent No.: US 8,208,356 B2
Ishihara et al. (45) Date of Patent: Jun. 26, 2012

(54) OPTICAL CHECKING METHOD AND APPARATUS FOR DEFECTS IN MAGNETIC DISKS

(75) Inventors: Ayumu Ishihara, Kamisato (JP); Hiroshi Nakajima, Hiratsuka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 15 days.

(21) Appl. No.: 12/975,405

(22) Filed: Dec. 22, 2010

(65) Prior Publication Data

US 2011/0158073 A1 Jun. 30, 2011

(30) Foreign Application Priority Data

Dec. 28, 2009 (JP) ................................. 2009-298014

(51) Int. Cl.
*G11B 7/00* (2006.01)
*G01N 21/00* (2006.01)
(52) U.S. Cl. .................. 369/53.1; 369/53.12; 356/237.2
(58) Field of Classification Search ................ 369/44.32, 369/53.45, 53.35, 53.32, 53.17, 53.15, 53.13, 369/53.1, 53.12; 356/273.2, 273.4, 273.3, 356/273.5, 73
See application file for complete search history.

(56) References Cited

U.S. PATENT DOCUMENTS 7,245,366 B2 * 7/2007 Miyakawa et al. ........ 356/237.2
7,605,913 B2 * 10/2009 Bills et al. .................. 356/237.2

FOREIGN PATENT DOCUMENTS

JP 06-347418 12/1994
JP 2002-257742 9/2002
JP 208-268189 11/2008

* cited by examiner

*Primary Examiner* — Nabil Hindi
(74) *Attorney, Agent, or Firm* — Antonelli, Terry, Stout & Kraus, LLP.

(57) ABSTRACT

An apparatus for optically checking magnetic disk defects that makes possible more accurate determination of positions of minute defects by illuminating an area greater than a checkup area with an illuminating beam having a Gaussian distribution is to be provided. The apparatus is configured of a specular reflection detecting device including a detector having a detecting face including an array of multiple pixels, and a processing device that figures out the position of each defect by using, in addition to the output signal from each of the pixels of the detector that detected a specular reflection from the checkup area, also output signals of some pixels out of the multiple pixels having detected the specular reflection from the checkup area of one turn before and the checkup area of one turn after, both adjoining in the radial direction, and determines the type of the defect.

20 Claims, 9 Drawing Sheets

FIG. 2A
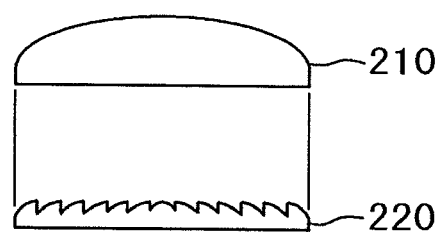
FIG. 2B
FIG. 3
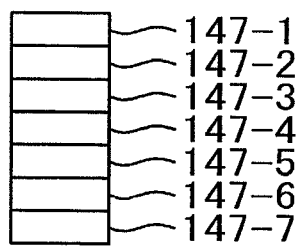
FIG. 4A
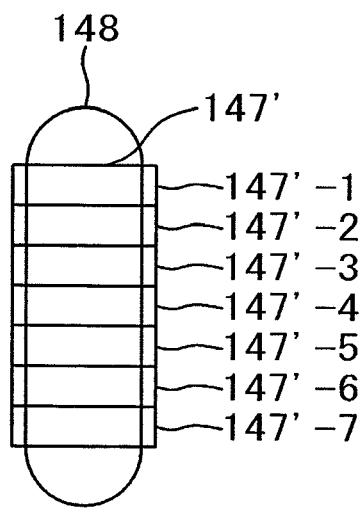
FIG. 4B
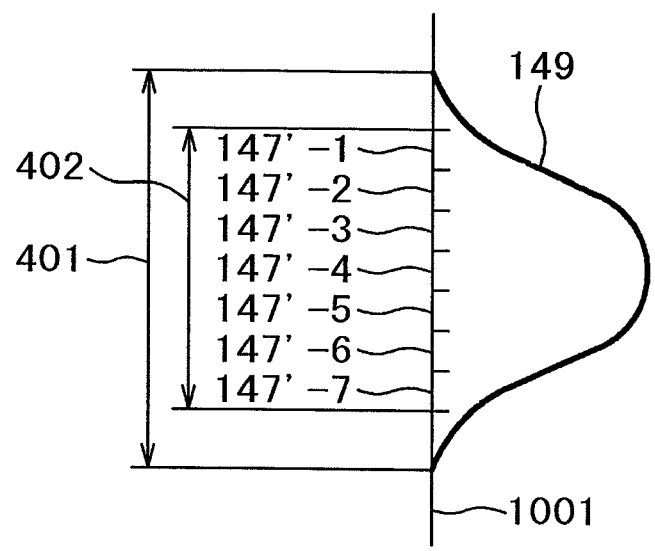

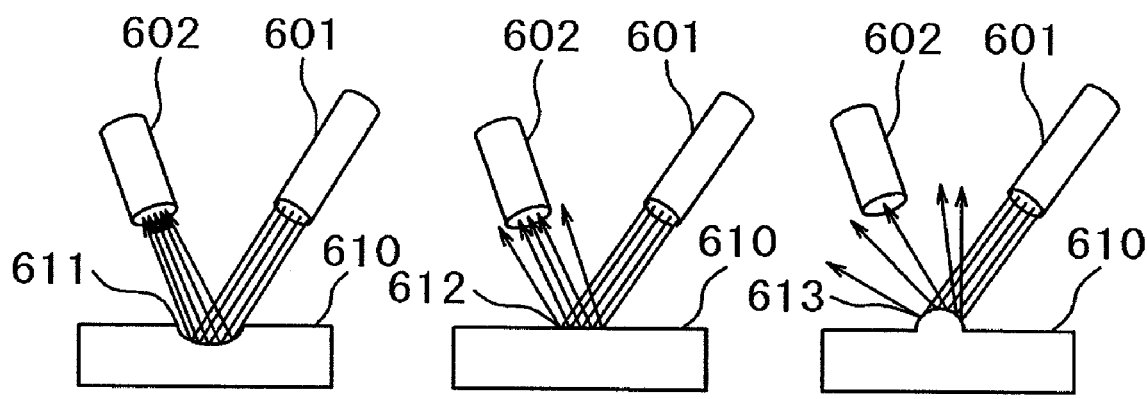
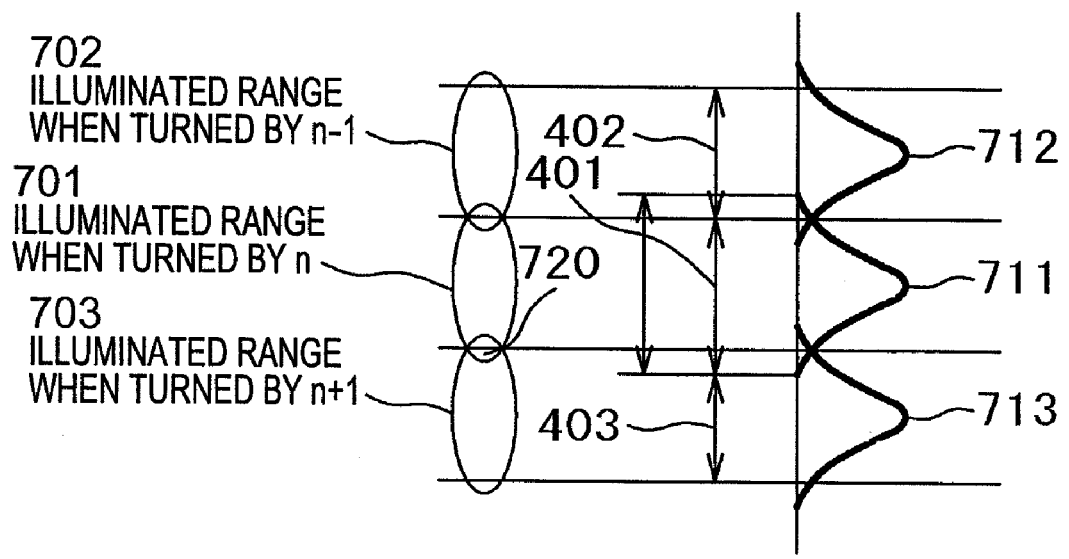

OPTICAL CHECKING METHOD AND APPARATUS FOR DEFECTS IN MAGNETIC DISKS

BACKGROUND

The present invention relates to a method and an apparatus for optically checking any defect in the surfaces of magnetic disks, and more particularly to an optical checking method and apparatus for defects in magnetic disks suitable for detecting any dent in the surfaces of and foreign matters sticking to both faces of conventional magnetic disks.

Known apparatuses for checking any defect in the surfaces of magnetic disks which are magnetic media for continuous recording are described in, for instance, JP-A No. 2002-257742 and JP-A No. 2008-268189. JP-A No. 2002-257742 discloses a configuration in which a rotating magnetic disk is irradiated with a laser beam in a slanted direction to have a specular reflection from the disk surface form an image on a detector provided with multiple light receiving elements and its detection signals are processed to detect defects.

JP-A No. 2008-268189 discloses a checking apparatus which irradiates a rotating magnetic disk with a laser beam, detects a specular reflection and scattered light from the disk surface, and detects and classifies defects on the disk surface by processing respective detection signals of the specular reflection and the scattered light.

On the other hand, though it is known that the laser beam that irradiates the magnetic disk has a Gaussian distribution of power in the cross section of its beam, it is described in JP-A No. Hei 6-347418 that observation at a uniform illuminating intensity is achieved by shifting a laser beam having a Gaussian distribution at intervals substantially equal to the radius of the laser flux along multiple sections of the object of observation thereby to superpose the flux over the multiple sections.

Along with the increase in recording capacities of magnetic disks, recording on magnetic disk is becoming higher in density and the defects to be detected are becoming smaller in size.

FIG. 10A and FIG. 10B show external views of a sample (magnetic disk) 100 to be checked according to the invention. FIG. 10A shows the magnetic disk 100, and FIG. 10B schematically shows an expanded partial view of a section thereof. The magnetic disk 100 has a structure in which a magnetic film 1012 (actually it is structured of a multi-layered film formed over a foundation layer) is uniformly formed over both faces of a substrate 1011 and the surfaces are covered by protective films 1013. Therefore, in an ideal state in which the surfaces have no defect at all, when the surface of the magnetic disk 100 is irradiated with a laser beam in a slanted direction, reflected beams having a distribution matching that of luminous energy in the section of the irradiating laser are detected from the surface of the magnetic disk 100.

On the other hand, the distribution 1101 of the luminous energy in the section at a right angle to the optical axis of the laser beam irradiating the surface of the magnetic disk 100 has a so-called Gaussian distribution pattern in which, as shown in FIG. 11, the energy is the strongest at the center (center of the optical axis) and weakens with the distance away from the center.

Usually, when the magnetic disk 100 is to be checked, the magnetic disk 100 is turned and any defect is extracted by detecting with a detector the reflected beams from the adjacent bands in the radial direction of the magnetic disk surface in each turn. In this process, each position of irradiation of the magnetic disk surface with the laser beam is caused to partially overlap with the immediately preceding position; thus the irradiated area is kept greater than the coverage of detection by the detector.

As a consequence, checking at a given point of time is influenced by reflected beams (scattered light) from a defect which existed in the irradiated area one turn before but is absent in the irradiated area at the current point of time, and an error in the position of detection is invited when greater accuracy of detecting the defective position is desired.

SUMMARY OF THE INVENTION

The present invention is intended to address the problems noted above and provide an optical checking apparatus for defects in magnetic disks that makes possible more accurate determination of minute defective positions.

Thus according to one aspect of the invention, an apparatus for optically checking defects in magnetic disks is configured of a specular reflection detecting device having a detector with a detecting face on which multiple pixels are arrayed; a control device which, when causing a magnetic disk to make one turn, consecutively shifts the magnetic disk in the radial direction so as to make a checkup area of the magnetic disk to be detected by the detector of the detecting device adjoin in the radial direction the checkup area of one turn before, and a signal processing device that figures out the position of each defect by using, in addition to an output signal from each of the pixels having detected the specular reflection from the checkup area of the magnetic disk, also the output signals of some pixels out of the multiple pixels having detected a specular reflection from the checkup area of one turn before and the checkup area of one turn after, both adjoining in the radial direction, and determines the type of the defect.

According to another aspect of the invention, in a method of optically checking defects in magnetic disks by irradiating a magnetic disk to detect a specular reflection and scattered light and thereby detecting any defect, the specular reflection from the surface of the magnetic disk is detected with a detector having a detecting face on which a plurality of pixels are arrayed, and while consecutively shifting the magnetic disk in the radial direction so as to make a checkup area of the magnetic disk to be detected by the detector when the disk has been caused to make a turn adjoin in the radial direction the checkup area of one turn before, the position of each defect is figured out by using, in addition to an output signal from each of the pixels having detected the specular reflection from the checkup area of the magnetic disk, also the output signals of some pixels out of the plurality of pixels having detected a specular reflection from the checkup area of one turn before and the checkup area of one turn after, both adjoining in the radial direction, and then the type of the defect is determined.

These features and advantages of the invention will be apparent from the following more particular description of preferred embodiments of the invention, as illustrated in the accompanying drawings.

BRIEF DESCRIPTION OF THE DRAWINGS

FIG. 2A shows a section of an aspheric lens;

FIG. 2B shows a section of an aspheric Fresnel lens matching the foregoing;

FIG. 3 shows a plan of the light receiving face of a photoelectric converter;

FIG. 4A is a plan of the laser-illuminated area of a magnetic disk illustrating the relationship between the illuminated area and a checkup area where pixels of a detector are used for detection of the magnetic disk;

FIG. 4B shows the distribution of luminous energy in the illuminated area;

FIGS. 6A to 6C schematically show the states of reflected beam distribution corresponding to different defects;

FIG. 7 is a plan of the illuminated area illustrating the relationship between the areas illuminated by laser beams adjoining in the radial direction of the magnetic disk and a checkup area for detection by a detector on the magnetic disk;

DESCRIPTION OF THE PREFERRED EMBODIMENTS

According to the invention, in order to enhance the accuracy of determining the convexity/concaveness of defects on the surface of a magnetic disk and at the same time to determine the positions of isolated defects and consecutive defects, an optical apparatus for checking defects in magnetic disk surfaces figures out the central position of a defect from reflected beams by also using detection signals in the adjoining checkup areas in the radial direction in each turn of the magnetic disk surface, and further determines the convexity/concaveness of each defect by comparing a reference signal in the central position of the defect and detection signals. The invention will be described with respect to a case in which the invention is applied to a checking apparatus that checks one face of a magnetic disk at a time and another case in which it is applied to a simultaneous two-face checking apparatus that checks both faces of a magnetic disk at the same time.

Embodiment 1

Figure 1A:
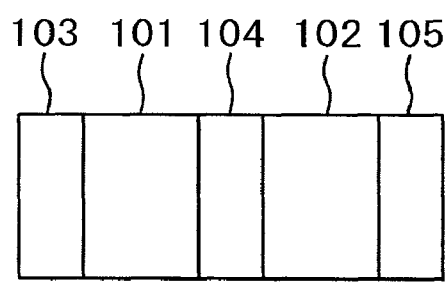
FIG. 1A is a block diagram showing the overall configuration of a magnetic disk defect checking apparatus.

FIG. 1A is a block diagram showing the overall configuration of a magnetic disk defect checking apparatus for describing the case in which the invention is applied to a checking apparatus that checks one face of a magnetic disk at a time.

Reference numeral 103 denotes a receptacle for receiving the magnetic disk 100 which is the checkup object; 101 denotes a first magnetic disk surface defect detector for checking one face of the magnetic disk 100; 104 denotes a magnetic disk reverser for reversing the magnetic disk 100 one of whose faces has been checked by the first magnetic disk surface defect detector 101; 102 denotes a second magnetic disk surface defect detector for checking the other face of the reversed magnetic disk 100; and 105 denotes an ejector for ejecting the checked magnetic disk 100. The first magnetic disk surface defect detector 101 and the second magnetic disk surface defect detector 102 have basically the same configurations.

Figure 1B:
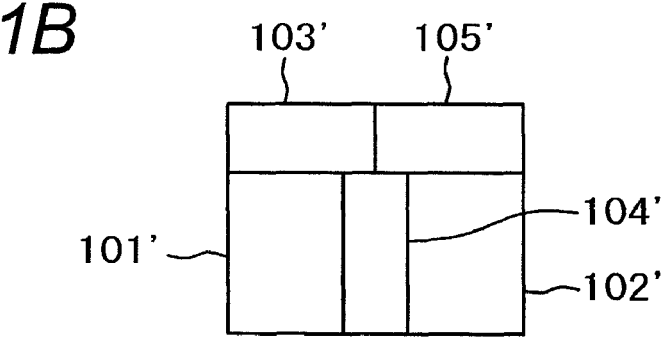
FIG. 1B is a block diagram showing the overall configuration of another magnetic disk defect checking apparatus.

FIG. 1B shows a case in which the constituent elements are arranged differently. The configuration is different from what is shown in FIG. 1A in that a receptacle 103' and an ejector 105' are arranged on the same side opposing a first magnetic disk surface defect detector 101', a second magnetic disk surface defect detector 102' and a magnetic disk reverser 104'.

Figure 1C:
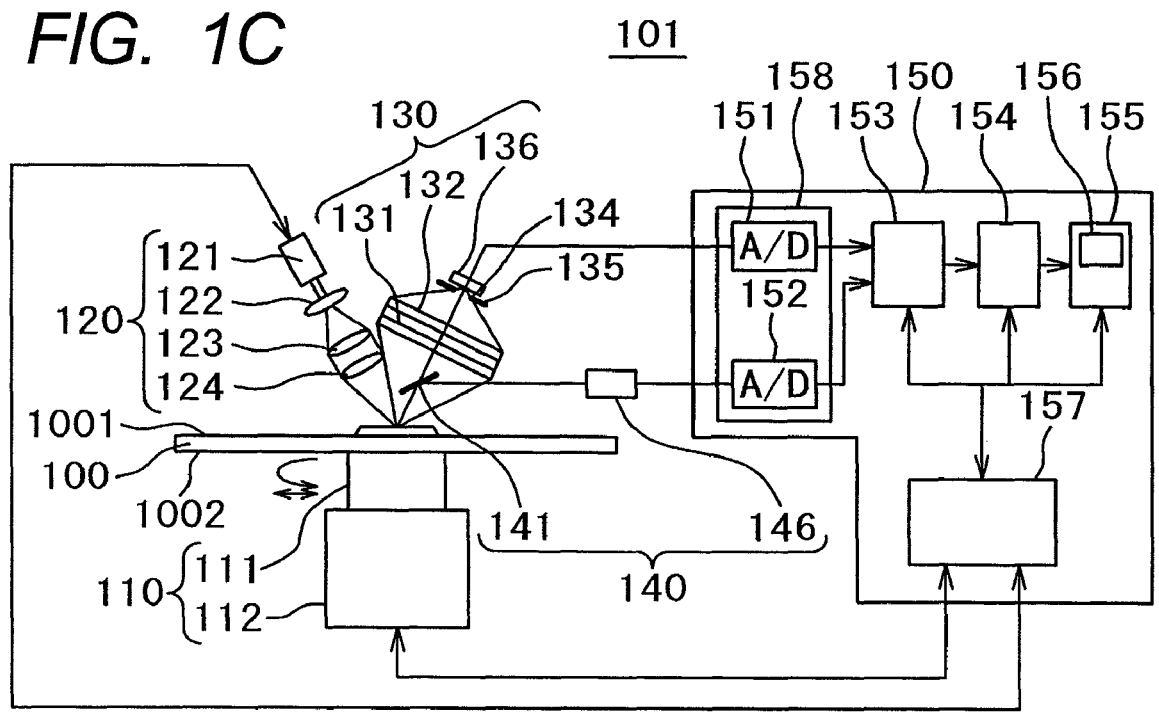
FIG. 1C is a block diagram showing an outlined configuration of an optical detector for magnetic disk defects in Embodiment 1.

FIG. 1C shows a detailed configuration of the example, taking up the first magnetic disk surface defect detector 101 as an example. The first magnetic disk surface defect detector 101, broadly analyzed, includes a table 110 on which a sample to be checked is to be mounted, an illuminating optical system 120, a scattered light detecting optical system 130, a specular reflection detecting optical system 140 and a signal processing and control system 150.

The table 110 is provided with a spindle 111 that can rotate mounted with a sample (magnetic disk) 100 and a stage 112 that shifts the spindle 111 in a direction at a right angle to the main axis of rotation.

The illuminating optical system 120 is provided with a laser beam source 121, a magnifying lens 122 that expands the diameter of the laser beam emitted from the laser beam source 121, a condensing lens 123 that condenses the laser beam whose diameter has been expanded, and a focusing lens 124 that focuses the condensed laser beam on the surface of the sample 100.

The scattered light detecting optical system 130 is provided with a first aspheric Fresnel lens 131 corresponding to an objective lens that condenses the scattered light out of the reflected beams (a specular reflection and scattered light) from the surface of the sample 100, a second aspheric Fresnel lens 132 corresponding to a focusing lens that focuses the condensed scattered light, a pinhole plate 135 that, having a pinhole 134 passing the scattered light focuses by the second aspheric Fresnel lens 132, intercepts other stray beams than the scattered light, and a first photoelectric converter 136 (e.g. an avalanche photodiode (APD) or a photomultiplier tube (PMT)) that detects with high sensitivity the scattered light having passed the pinhole 134 in the pinhole plate 135.

In the specular reflection detecting optical system 140, a mirror 141 reflects, out of reflected beams (a specular reflection and scattered light) from the sample 100 the specular reflection and thereby switches the optical path, and a second photoelectric converter 146 (PIN photodiode) is caused to receive the specular reflection whose optical path has been switched. The mirror 141 is formed sufficiently small not to receive any other beams than the specular reflection (scattered light). The second photoelectric converter 146 is provided with multiple detecting elements (e.g. a photodiode array having multiple pixels or an avalanche photodiode (APD) array).

FIG. 2A shows a usual optical lens 210, and FIG. 2B shows an example of aspheric Fresnel lens 220 having the same aperture as the lens 210. As seen from these drawings, the aspheric Fresnel lens 220 can be formed thinner than the usual optical lens 210 having the same aperture. In this embodiment, aspheric Fresnel lenses having such a characteristic are used as the first aspheric Fresnel lens 131 and the second aspheric Fresnel lens 132.

The signal processing and control system 150 has a photoelectric converter 158 provided with a first A/D converter 151 that subjects to A/D conversion and amplifies the output of a first photoelectric converter 136 and a second A/D converter 152 that subjects to A/D conversion and amplifies the output of a second photoelectric converter 145, a signal processor 153 that receives and subjects to signal processing the outputs of the first A/D converter 151 and of the second A/D converter 152, a storage 154 that stores the results of processing by the signal processor 153, an output unit 155 provided with a display screen 156 that outputs the results of processing by the signal processor 153, and an overall controller 157 that controls the whole system.

Next, the operation of each unit will be described.

The table 110, controlled by the overall controller 157, rotates the spindle 111 in a state of being mounted with the sample 100 and at the same time shifts the stage 112 in a direction at a right angle to the main axis of rotation of the spindle 111 in synchronism with the rotation of the spindle 111.

While rotating and shifting the sample 100 with the table 110, the laser beam emitted from the laser beam source 121 of the illuminating optical system 120 under the control of the overall controller 157 is focused by the focusing lens 124 and caused to irradiate the surface of the sample 100.

From the surface 1001 of the laser beam-irradiated sample 100, reflected beams (scattered light and a specular reflection) are generated correspondingly to the defects and scars or minute convexity/concaveness (roughness) of the surface. In this process, the scattered light is distributed according to the sizes of defects on the surface of the sample 100. Thus, scattered light from large defects or scars is distributed with higher intensity and more directionality, while scattered light from minute defects or scars are distributed with lower intensity and more broadly.

Out of the reflected beams from the surface 1001 of the laser beam-irradiated sample 100, the specular reflection is reflected by the mirror 141 arranged at the same angle of emission (on the optical path of the specular reflection) as the angle of incidence of the laser beam coming incident on the surface 1001 of the sample 100 and proceeds towards the second photoelectric converter 146.

As shown in FIG. 3, multiple pixels 147-1 through 147-$n$ ($n=7$ in FIG. 3) are arrayed on the light receiving face 147 (the face on which the specular reflection from the surface 1001 of the sample 100 comes incident) of the second photoelectric converter 146, and detect light from the specular reflection on the surface 1001 of the sample 100.

FIG. 4A shows the relation ship between an area 147' of the surface 1001 of the sample 100 to be detected by the second photoelectric converter 146 and an area 148 of the surface 1001 of the sample 100 to be irradiated with the laser beam. FIG. 4B shows the relationships between a luminous energy distribution 149 in the area 148 to be irradiated with the laser beam and the imaging ranges of the pixels 147-1 through 147-7 in the light receiving face 147 of the second photoelectric converter 146. The luminous energy distribution 149 of the laser beam is a Gaussian distribution. The laser beam-irradiated range (the length of the area 148) 401 on the surface 1001 of the sample 100 is greater than the imaging range 402 of the second photoelectric converter 146.

On the other hand, out of the reflected beams from the laser beam-irradiated surface 1001 of the sample 100 and not reflected by the mirror 141 (scattered light), those coming incident on the first aspheric Fresnel lens 131 serving as an objective lens are condensed, and come incident on the second aspheric Fresnel lens 132 serving as a focusing lens to be focused on the detecting face (not shown) of the first photoelectric converter 136 and are detected by the high-sensitivity first photoelectric converter 136.

As the first aspheric Fresnel lens 131 and the second aspheric Fresnel lens 132 are thinner and lighter than comparable conventional optical lenses, it is made practicable to build the body tube (not shown) to house them more compactly than the body tube for conventional optical lenses, resulting in greater freedom of selecting the position of installation and making it practicable to design the tube with a number of apertures (NA) of not smaller than 0.6 (NA is 0.4 or less where conventional optical lenses are used). As a result, since scattered light from minute defects is in a substantially isotropic distribution as described above and, as the level of a detection signal is proportional to the square measure of the detecting face if the sensitivity of detection is the same, higher level detection signals can be obtained than where a detection optical system configured of conventional optical lenses can be obtained. Therefore, scattered light from smaller defects than what could be detected with a conventional system can be detected.

The A/D converters 151 and 152 convert analog signals outputted from the first photoelectric converter 136 and the second photoelectric converter 146, respectively, into digital signals and output the converted signals that are increased in amplitude.

The digital signals outputted from the A/D converters 151 and 152 are inputted to the signal processor 153, and both or one of the digitally converted output signals from the first photoelectric converter 136 and the second photoelectric converter 146 are used for processing by the signal processor 153 to detect any defect existing on the surface 1001 of the sample 100, and identifies the position of each detected defect on the substrate 1011 by using information on the irradiated position on the sample 100 obtained from the overall controller 157 that controls the table 110. Further in the signal processor 153, the type of each detected defect is identified on the basis of the characteristics of detection signals from the first photoelectric converter 136 and the second photoelectric converter 146.

Regarding this embodiment, though the configuration in which the scattered light detecting optical system 130 uses the first aspheric Fresnel lens 131 and the second aspheric Fresnel lens 132 has been described, a configuration in which a combination of aspheric lenses or ordinary spherical lenses, in place of these Fresnel lenses, as shown in FIG. 2A may as well be used.

Figure 5:
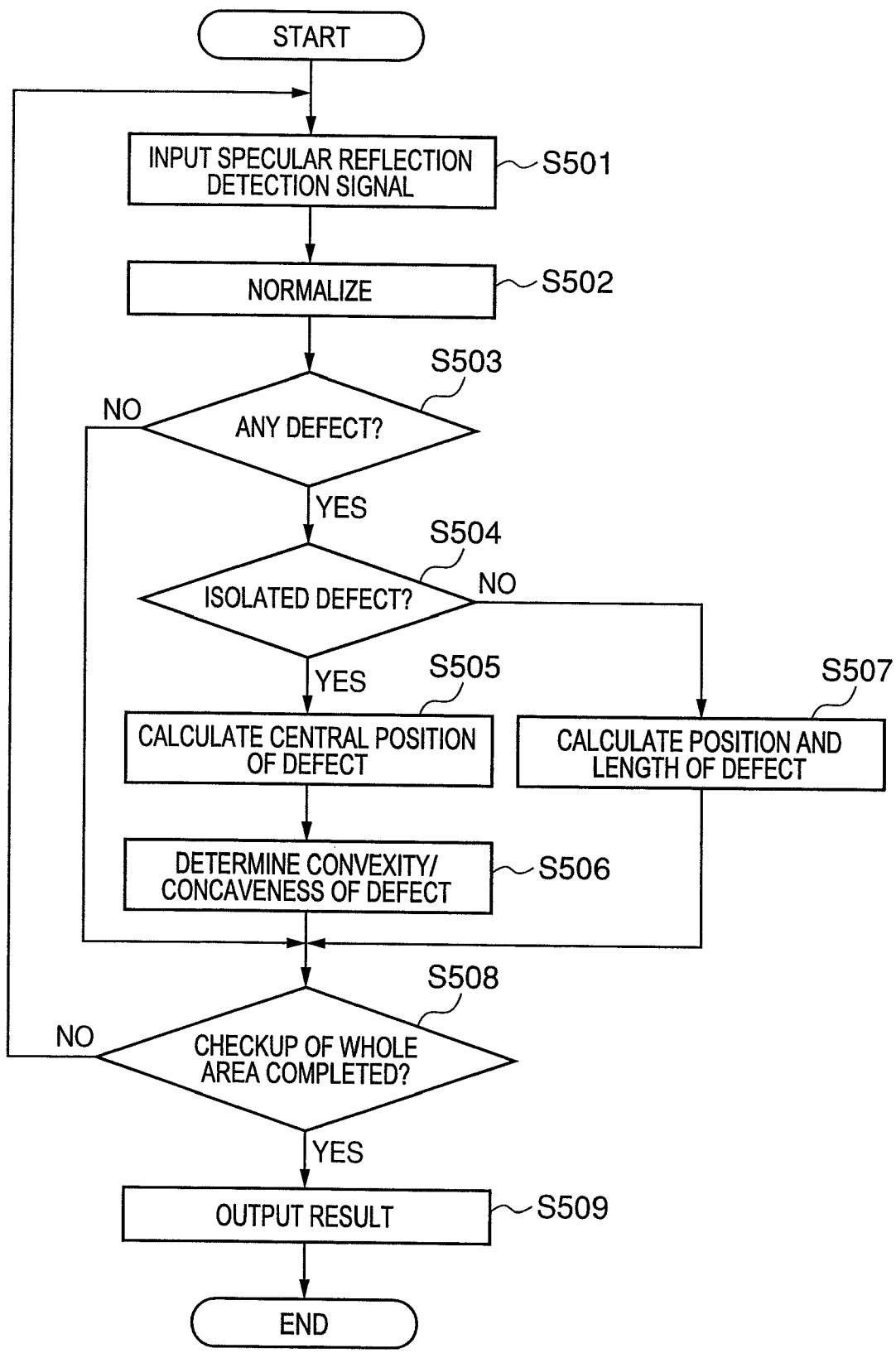
FIG. 5 charts the flow of processing to detect defects in Embodiment 1.

Next, extraction of defects and processing to classify the extracted defects, both accomplished by the signal processor 153, will be described with reference to FIG. 5.

The signal having detected specular reflection from the surface of the sample 100 with the second photoelectric converter 146 of the specular reflection detecting optical system 140 is converted into a digital signal by the A/D converter 152 and inputted to the signal processor 153 (S501). The signal inputted to the signal processor 153 is once stored in a storage (not shown), and is normalized by dividing the values of output signals from sequentially inputted pixels by a specular reflection detection signal (the output from each pixel 147 of the second photoelectric converter 146), stored in advance, from a defect-free area (S502).

Next, the presence or absence of any defect is determined from this normalized signal waveform (obtained by plotting the value of each normalized pixel) (S503). If this normalized signal waveform is in the range of $1\pm\epsilon$ ($\epsilon$ is the tolerance) in the whole area (all the pixels 147-1 through 147-7 of the second photoelectric converter 146), the area is determined to be free of defect, and the next area is checked. Or if any part or the whole area of this normalized signal waveform is outside the range of $1\pm\epsilon$, the area is determined to have a defect.

Next, if the presence of a defect is determined, it is determined whether that defect is an isolated defect or a continuous linear defect (S504). Here, if any part of this normalized signal waveform is found to be outside the range of $1\pm\epsilon$, the defect is determined to be isolated; or if the whole area of the normalized signal waveform outside the range of $1\pm\epsilon$, the defect is determined to be linear.

If the defect is determined to be isolated, the central position of the defect is figured out by a method to be described afterwards from the signal waveform in which the pixels 147-1 through 147-7 of the second photoelectric converter 146 are normalized (S505), and the convexity/concaveness of the defect is determined from the level of the normalization signal in the central position is determined (S506).

It the defect is determined to be linear, it is stored in the storage and combined with a signal obtained by detecting reflected beams from an area one pitch deviating from the sample 100 in its radial direction when the sample 100 has made one turn to figure out the size of the defect (S507). This checkup is applied to the whole surface of the sample 100 (S508), and the result is displayed on the display screen 156 of the input/output unit 155 (S509).

When checkup of one surface of the sample 100 is completed, the sample 100 is fed from the first magnetic disk surface defect detector 101 to and reversed by the magnetic disk reverser 104 or 104' as shown in FIG. 1A or FIG. 1B, and the unchecked surface is now directed upward. Next, the reversed sample 100 is carried to the second magnetic disk surface defect detector 102 or 102' to undergo the steps S501 through S509 described earlier.

The sample 100 both surfaces of which have been checked is fed to the ejector 105 or 105' to be taken out of the apparatus.

Figure 9:
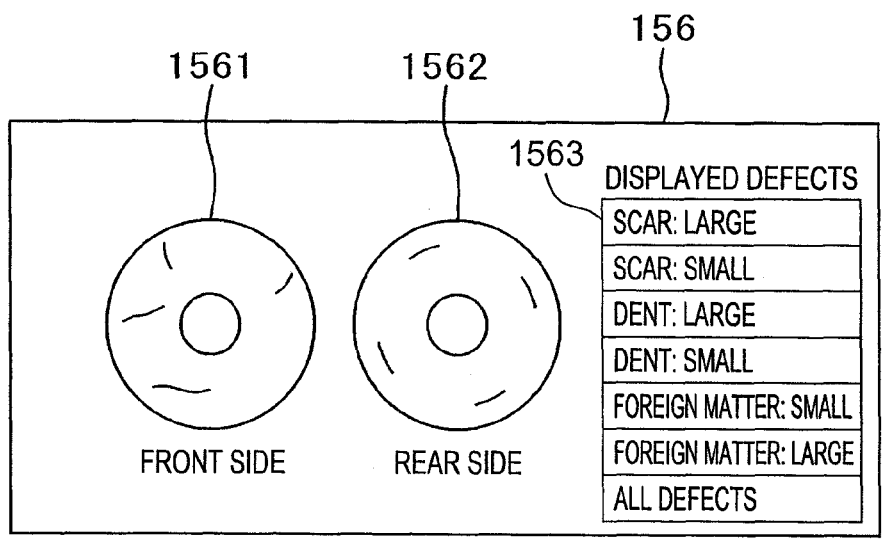
FIG. 9 shows a display screen mapping the result of checkup in Embodiment 1.
Figure 10A:
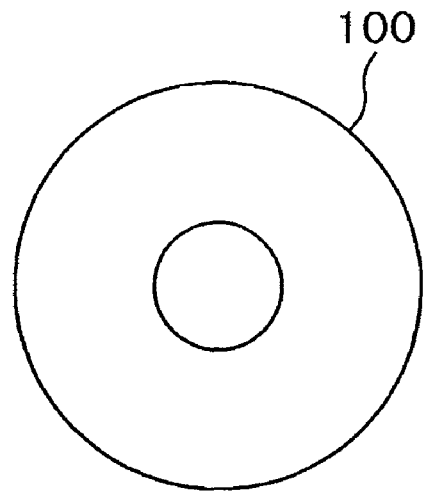
FIG. 10A shows a plan of the magnetic disk.
Figure 10B:
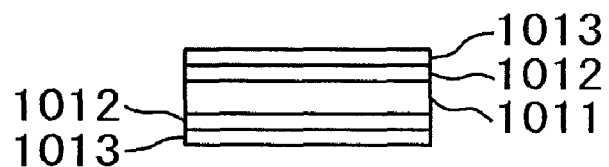
FIG. 10B shows a section of the magnetic disk.

The result of determination by the signal processor 153 is stored into the storage 154 together with positional information on the defects and at the same time, as shown in FIG. 9, a front side defect distribution 1561 and a rear side defect distribution 1562 are mapped on the screen 156 of the output unit 155, on which defects selected by a defect display selector 1563 are displayed, classified by type and by size, to be distinguishable from each other on a front side defect map 1561 and a rear side defect map 1562.

Next, processing at S506 whereby the central position of the defect is figured out at S505 from the detection signal of the defect determined to be isolated at S504 and the convexity/concaveness of the defect is determined will be described.

Figure 11:
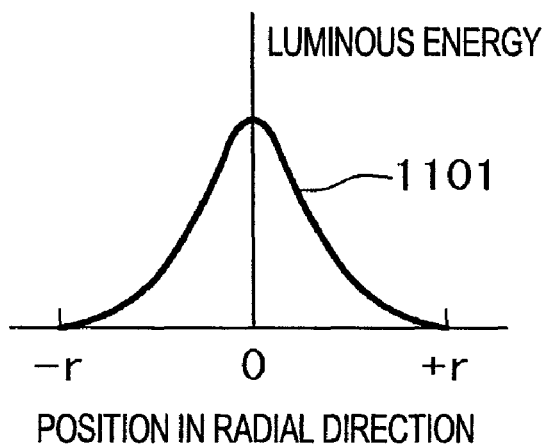
FIG. 11 is a graph showing the distribution of luminous energy in a section at a right angle to the optical axis of the laser beam.

In the specular reflection detecting optical system 140, as described earlier, a luminous energy distribution 1002 within a section at a right angle to the optical axis of the laser beam irradiating the surface 1001 of the sample 100 constitutes a so-called Gaussian distribution in which the energy is the strongest at the center (center of the optical axis) and weakens with the distance away from the center as shown in FIG. 11. Extraction of a defect by detecting an image formed by reflected beams from a defect irradiated with a laser beam having such a luminous energy distribution can be accomplished by "normalization", that is, figuring out for each pixel the ratio of the output signal of each pixel of the second photoelectric converter 146 having detected an image by a specular reflection when each area on the sample 100 has been illuminated with reference to the output signal of each pixel of the second photoelectric converter 146 having detected the image of an image by specular reflection when a defect-free area has been illuminated with a laser beam.

Thus, while the output from each pixel at the time when a specular reflection from a defect-free area in the sample 100 has been detected is 1 in ratio to the reference output signal, the signal having detected a specular reflection from a defective area in the sample 100 may be either greater than the reference output signal (mainly a concave defect) or smaller (mainly a convex defect). Thus, the value resulting from normalization (division of the output signal of each pixel by the reference output signal of each pixel) of each pixel with reference to the output signal of each pixel obtained by detection of a specular reflection from a defect-free area may be either greater or smaller than 1. In this way, by comparing the output signal of each pixel with the corresponding reference signal, the presence or absence of any defect and, if present, the type of the defect can be determined.

FIGS. 6A through 6C schematically show the relationship between the state of scattered light generation and a detector 602 when a laser beam emitted toward a defect from a laser beam source 601 irradiates a sample 610. FIG. 6B shows a state in which there is no defect on the sample 610. When a laser beam emitted from the laser beam source 601 irradiates a defect-free face 612, it is reflected in the same luminous energy distribution as at the time of incidence and reaches the detector 602. FIG. 6A shows a case in which a concave defect 611 in the sample 610 is irradiated with a laser beam. The laser beam irradiating the concave defect 611 is so reflected by the lens action as to focus on the detector 602 side. Thus, the reflected beam from the concave defect 611 tends to be higher in luminous intensity than its surroundings. Further, the convergence of reflected beams from a defect reduces the luminous energy of reflected beams from the peripheries of the defect, resulting in a downward trend of the detection signal level. On the other hand, FIG. 6C shows a case in which a convex defect 613 on the sample 610 is irradiated with a laser beam. The laser beam irradiating the convex defect 613 scatters at a wide angle, resulting in the arrival of less luminous energy at the detector 602 than in the case of the defect-free area shown in FIG. 6B. Also, affected by the scattered light, the level of detection signals in the area around the defect rises. Thus in an image representing a convex defect, the convex defect part is dark and the area around it is somewhat brighter. By utilizing this characteristic of the reflection of a laser beam irradiating a defect in investigating the distribution of reflected luminous energy, it is possible to distinguish between concave defects and convex defects.

FIG. 7 illustrates the relationship between the laser beam-irradiated position on the surface at each turn of the sample 100 and the areas detected by the multiple pixels 147-1 through 147-7 of the light receiving face 147 of the second photoelectric converter 146. Whereas the imaging areas in the radial direction are so set as to shift in the radial direction the imaging area (checkup area) 401 at the time when the spindle has made n turns with the stage 112 controlled by the overall controller 157 to become directly adjacent to the imaging area (checkup area) 402 at (n−1) turns and to the imaging area (checkup area) 403 at (n+1) turns, the illuminated area 701 (the luminous energy distribution of the illuminating beam is represented by 711) at n turns partly overlaps the illuminated area 702 (the luminous energy distribution of the illuminating beam is represented by 712) at (n−1) turns and the illuminated area 703 (the luminous energy distribution of the illuminating beam is represented by 713) at (n+1) turns.

As described with reference to FIGS. 6A through 6C, in the presence of the concave defect 611, the convergence of the luminous intensity of the reflected beams from the defect causes that of the reflected beams from the peripheries of the defect to decrease and, in the presence of the convex defect 613, scattering of the reflected beams from the defect at a wide angle causes the luminous intensity of the reflected beams from the peripheries of the defect to increase to some extent.

Thus in the case shown in FIG. 7, out of the image signals obtained by shooting the checkup area 401, signals from pixels having detected the parts close to the area 403 are at a lower level than those from the surroundings when the defect 720 is concave or at a higher level than the surroundings when the defect 720 is convex because of the influence of a defect 720 that does not exist in the checkup area 401. As a result, at the time of n turns, images detected by the pixels 147-1, 147-2, 147-6 and 147-7, out of the images of the surface 1001 of the sample 100 detected by the pixels 147-1 through 147-7 of the second photoelectric converter 146, may be affected by reflected beams from the adjoining areas (scattered light from defects).

For this reason, even if no defect exists in the checkup area 401 at the time of n turns, some of the reflected beams from the defect 720 existing in the checkup area 703 at the time of (n+1) turns enter into the multiple pixels 147-6 and 147-7 of the light receiving face 147 of the second photoelectric converter 146 in the illuminated area 701 at the time of n turns and affect the detection signals from the respective pixels.

Figure 8A:
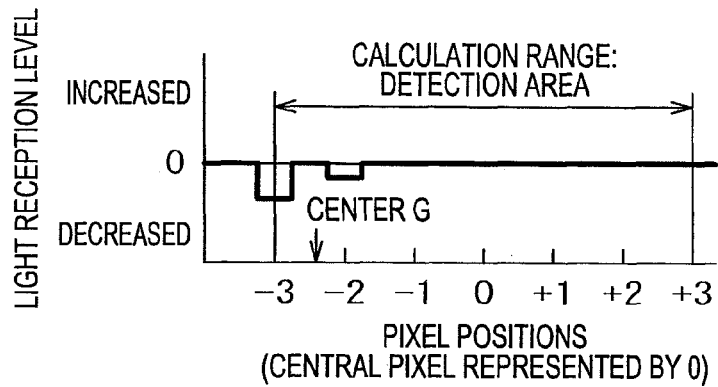
FIG. 8A is a graph showing the output signal of each pixel having detected specular reflection from a checkup area on the magnetic disk and the central position of the defect figured out therefrom.
Figure 8B:
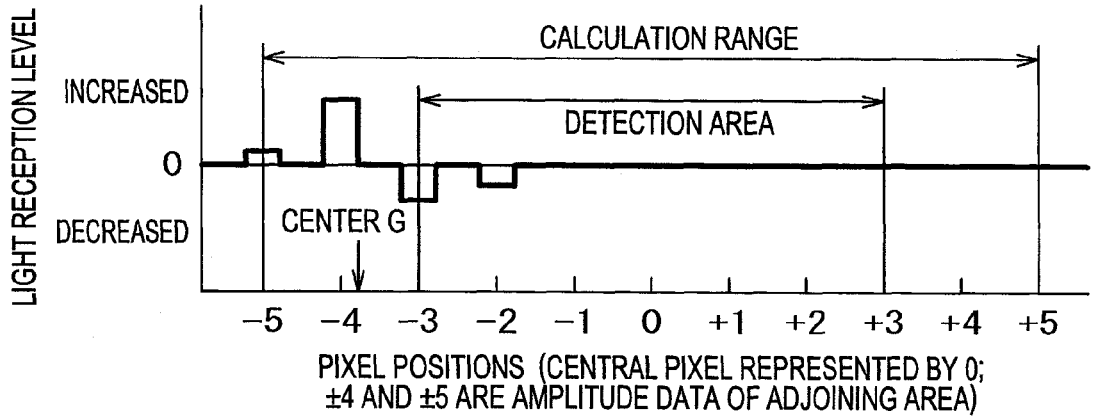
FIG. 8B is a graph showing the output signal of each pixel having specular reflection from the checkup area on the magnetic disk plus, out of the output signals of individual pixels having detected specular reflection from the preceding and following checkup areas adjoining in the radial direction, two-pixel equivalents of output signals on the sides adjoining the current checkup area and the central position of the defect figured out therefrom.

Description will made below of cases in one of which, when the positional relationship between the defect checkup area 401 and the defect 720 is as shown in FIG. 7, any defect is detected by using only the detection signals of the pixels 147-1 through 147-7 of the second photoelectric converter 146 at the time of n turns (FIG. 8A) and in another of which any defect is detected by using the output signals of pixels having detected a specular reflection in an area shape overlapping a detection area 401 at the time of n turns out of a detection area 402 at the time of (n−1) turns and the output signals of pixels having detected specular reflection in an area shape overlapping the detection area 401 at the time of n turns out of a detection area 403 at the time of (n+1) turns (FIG. 8B).

The displays in FIG. 8A and FIG. 8B suppose that, out of the seven pixels of the second photoelectric converter 146, the central position is the center (0), one side is + and the other is −.

The central pixel position G of a defect in a detection signal, where the central position is represented by 0, the reference number of each pixel counted from this central pixel by +n or −n and the absolute value of the balance of subtracting 1 out of the normalized output of each pixel by Sn, is defined by (Equation 1).

[Equation 1]

$$G = \sum_{n=-n}^{+n} n \cdot \frac{S_n}{\sum_{n=-n}^{+n} S_n}$$ (Equation 1)

If any defect is detected by using only the detection signals of the second photoelectric converter 146 at the time of n turns as shown in FIG. 8A, the central position of the defect will be determined to be the pixel position of −3 and, as the beam reception signal level then is negative, the presence of a convex defect in the pixel position of −3 will be determined.

Therefore in this embodiment, with a view to reducing the influence of reflected beams from illuminated areas off the imaging range (checkup area), signals of two pixels on the side closer to the detection area at the time of n turns out of the detection signals at the time of (n−1) turns and at the time of (n+1) turns are also used in addition to the detection signals of the pixels 147-1 through 147-7 of the second photoelectric converter 146 at the time of n turns to extract any defect at the time of n turns and figure out the position of the defect. The number of pixels for use here is not limited to two, but may as well be three or more. FIG. 8B shows an example of signal used for figuring out the position of the defect.

FIG. 8B shows a case in which an image formed by a specular reflection from a checkup area at the time of n turns with reference to the output signals from pixels having detected the specular reflection from a defect-free area is detected with the second photoelectric converter 146 and 1 is subtracted from the normalized values of the detection signals outputted from the pixels 147-1 through 147-7, the result also including the addition of two pixels on the side closer to the checkup area at the time of n turns out of the detection signals at the time of (n−1) turns and at the time of (n+1) turns. In FIG. 8B, too, out of the seven pixels of the second photoelectric converter 146, the central position is displayed as the center (0), one side as + and the other as −, and the output signals from the pixels on the adjacent areas, one at the time of (n−1) and the other at the time of (n+1), are displayed as +4, +5 and −4, −5, respectively.

To figure out the central position of the defect by also using some of the detection signals at the time of (n−1) turns and at the time of (n+1) turns in FIG. 8B, the central position of the defect comes to the position of the pixel of −4. As this position is off the detection area, away from the pixel position range of −3 to +3, the absence of any defect in the detection area at the time of n turns is determined.

By identifying the defective position by using detection signals in the areas adjoining the checkup area in this way, it is made possible in extracting any defect to reduce the influence of reflected beams from nearby defects in the vicinities of the checkup area.

Also, it is possible to determine the convexity or concaveness of the defect from the output signal level at the figured-out central position of the defect by using the difference in the characteristics of luminous energy distribution between scattered light from a concave defect and a convex defect described with reference to FIG. 6. Thus, by utilizing the characteristics of reflected beams from the defective part, the type of the defect can be determined on the basis of the normalization signal level in the central position of the defect.

When the type of a defect is to be determined on the basis of the normalization signal level in the detected central position of the defect in this way, if only the detection signal at the time of n turns is used, the pixels 147-1, 147-2, 147-6 and 147-7 in the surroundings will be outside the imaging area at the time of n turns and, influenced by reflected beams from defects existing in the laser beam-irradiated area at the time of n turns, the detected luminous energy will vary with the consequence that the figured-out central position of the defect is off the real position; where the type of the defect is to be determined on the basis of the normalization signal level in the central position of the defect, for instance a convex defect could be mistaken for a concave defect.

By contrast in this embodiment, reflected beams from defects existing in the area off the imaged area at the time of n turns and irradiated with a laser beam at the time of n turns are also used in figuring out the central position of the defect in order to figure out the central position of the defect by also using signals having detected output signals from pixels in the adjacent areas at the time of (n−1) turns and at the time of (n+1) turns, and therefore erroneous defect determination can be prevented, making it possible to determine the defect shape more accurately.

Embodiment 2

Next, a case in which the invention is applied to a two-face checking apparatus that checks both faces of a magnetic disk at the same time will be described as a second preferred embodiment of the invention with reference to drawings.

Figure 12A:
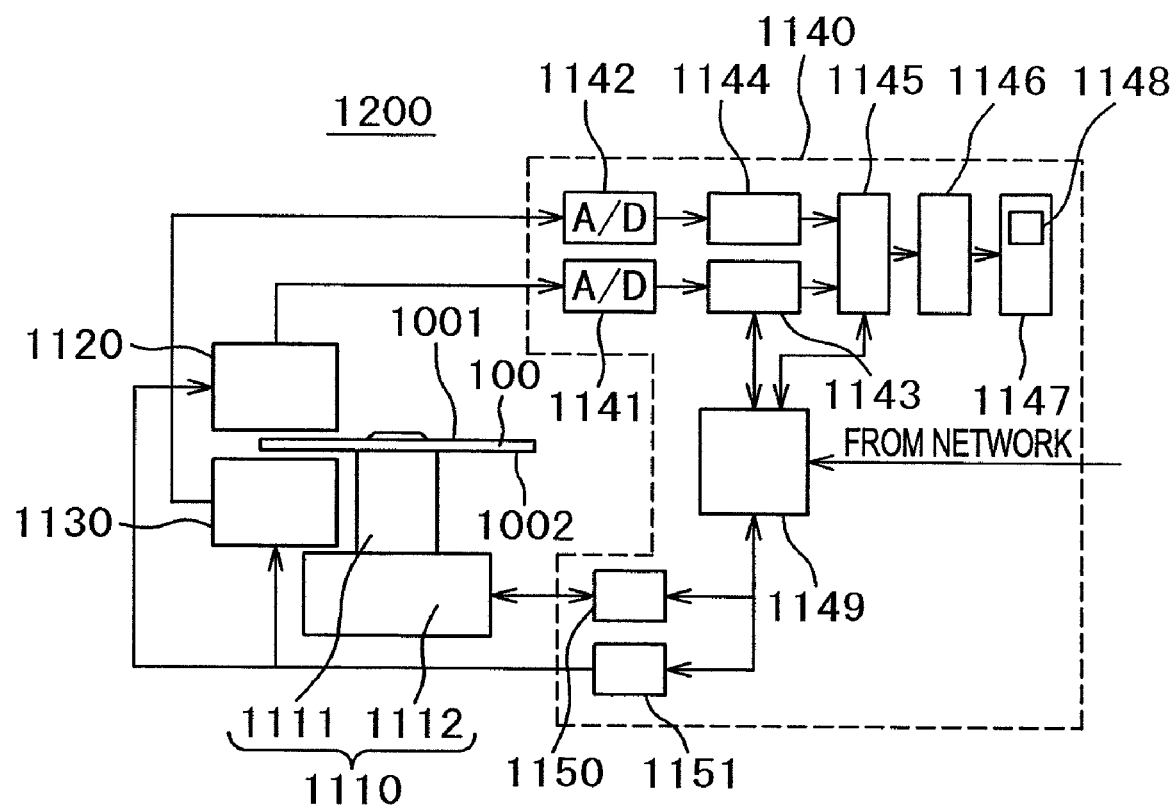
FIG. 12A is a block diagram showing an outlined configuration of a magnetic disk two-face defect detector in Embodiment 2.

FIG. 12A shows an overall configuration of a two-face defect detector 1200 that checks both faces of a magnetic disk at the same time in this embodiment. Broadly analyzed, the two-face defect detector 1200 includes a table section 1110 on which a sample to be checked is to be mounted, a front side checking optical system 1120, a rear side checking optical system 1130 and a signal processing and control system 1140.

The table section 1110 is provided with a table (spindle) 1111 that can rotate mounted with a sample (magnetic disk) 100 and a stage 1112 that shifts the table 1111 in a direction at a right angle to the main axis of rotation. Further, the table section has a mechanism (not shown) that chucks and holds the sample 100.

Figure 12B:
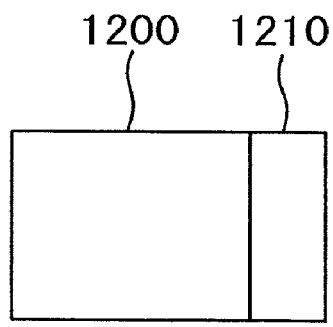
FIG. 12B is a block diagram showing the configuration of a magnetic disk defect checking apparatus in Embodiment 2.

FIG. 12B is a block diagram showing the configuration of a magnetic disk defect checking apparatus equipped with the two-face defect detector 1200 of this embodiment. The overall apparatus includes the two-face defect detector 1200 and a magnetic disk receptacle/ejector 1210 in a more simple configuration than the apparatus for checking one side at a time of a magnetic disk as shown in FIG. 1A and FIG. 1B.

Regarding the two-face defect detector 1200, the basic configuration of the front side checking optical system 1120 for detecting any defect on the front side 1101 of the sample 100 is the same as what was described with reference to Embodiment 1, and therefore its description will be dispensed with.

Figure 13A:
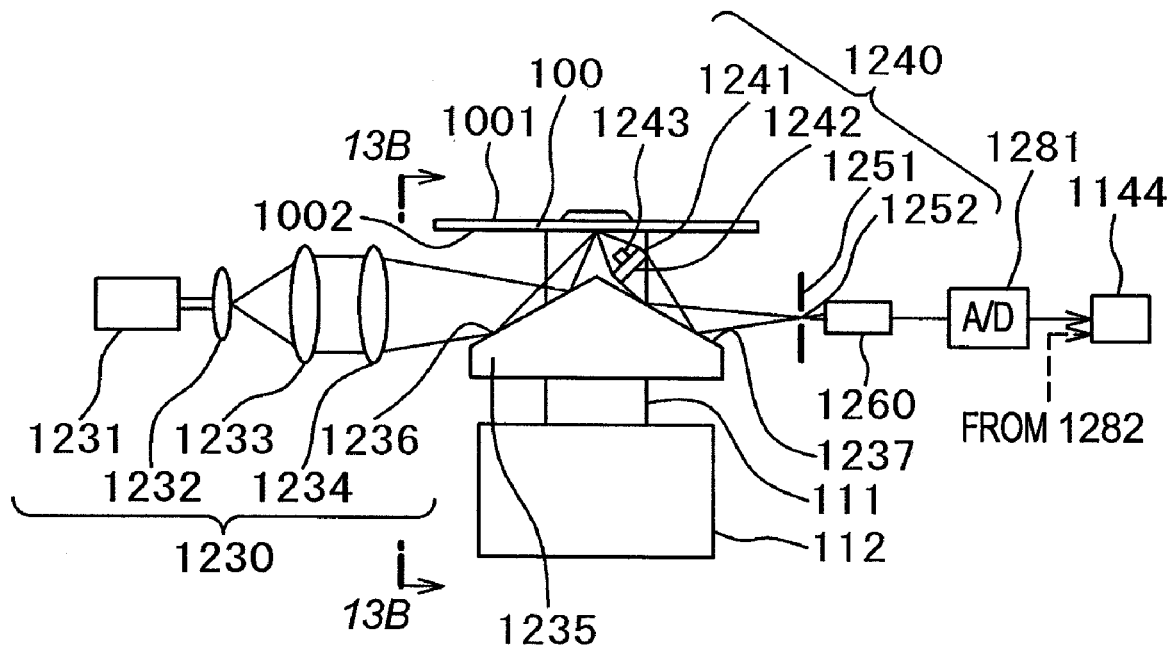
FIG. 13A is a front view showing an outlined configuration of an optical checkup system on the rear side in Embodiment 2.
Figure 13B:
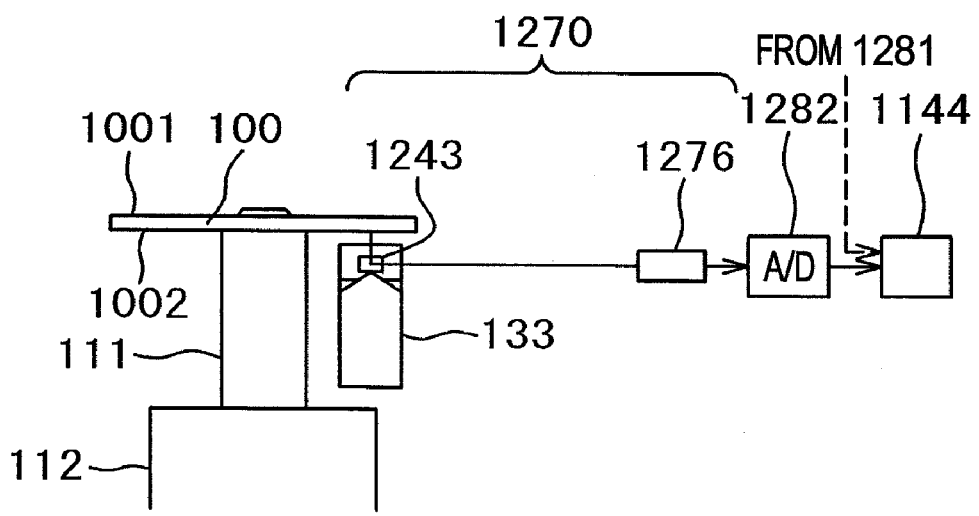
FIG. 13B is a side view in the A-A direction of the optical checkup system on the rear side in Embodiment 2.

An outlined configuration of the rear side checking optical system 1130 that detects any defect on the rear side 1102 of the sample 100 is shown in FIG. 13A and FIG. 13B. The rear side checking optical system 1130 includes an illuminating system 1230, a scattered light detecting optical system 1240 and a specular reflection detecting system 1270.

The illuminating system 11301 of the rear side checking optical system 1130, as shown in FIG. 13A, includes a second laser beam source 1231, a magnifying lens 1232 that magnifies the laser beam emitted from the second laser beam source 1231, a condensing lens 1233 that condenses the magnified laser beam, a focusing lens 1234 that focuses the condensed laser beam on the rear side of the sample 100 and a prism 1235 that bends the optical path the laser beam transmitted by the focusing lens 1234. Since the laser beam is reflected by a face 1236 of the prism 1235 to bend the optical path in this configuration, the second laser beam source 1231 is enabled to be disposed away from the relatively narrow space underneath the disk 100, and checkup of the rear side is made possible without modifying the table 110 in a substantial way as compared with the conventional apparatus for checking one side at a time of a disk.

A scattered light detecting system 1240 on the rear side includes a third aspheric Fresnel lens 1241 that corresponds to an objective lens for condensing scattered light out of reflected beams (a specular reflection and scattered light) generated from the rear face 1002 of the sample 100 irradiated with a laser beam, a fourth aspheric Fresnel lens 1242 that corresponds to a focusing lens for focusing the condensed scattered light, a pinhole plate 1251 that has a pinhole 1252 passing the scattered light having been transmitted by the fourth aspheric Fresnel lens 1242 and reflected by a face 1237 of the prism 1235 to undergo switching of the optical path and intercepts other stray beams than the scattered light from the rear face 1002 of the sample 100, and a third photoelectric converter 1260 (e.g. an avalanche photodiode (APD) or a photomultiplier tube (PMT)) that detects with high sensitivity the scattered light having passed the pinhole 1252 in the pinhole plate 1251.

As the combined use of the aspheric Fresnel lenses 1241 and 1242 with the prism 1235 in the scattered light detecting system 1240 on the rear side enables the optical system with a relatively large number of apertures (NA) to be disposed away from the relatively narrow space underneath the disk 100 and moreover the detection involves bending of the optical path of scattered light by the prism 1235, checkup of the rear side is made possible without modifying the table 110 in a substantial way as compared with the conventional apparatus for checking one side at a time of a disk.

A specular reflection detecting system 1270 on the rear side, as shown in FIG. 13B, is provided with a mirror 1243 (which reflects beams in a direction perpendicular to the paper surface in the configuration shown in FIG. 13A) that switches the optical path of the specular reflection out of reflected beams (the specular reflection and scattered light) from the rear face 1002 of the laser beam-irradiated sample 100 and a fourth photoelectric converter 1276 (an avalanche photodiode (APD)) that detects the specular reflection from the rear face 1002. The configuration of the fourth photoelectric converter 1276 is the same as that of the second photoelectric converter 146 described with respect to Embodiment 1.

In FIG. 12, the signal processing system 1140 is provided with a first A/D converting section 1141 (corresponding to the A/D converting section 158 in the configuration shown in FIG. 1C) having a first A/D converter 151 (corresponding to 101 in FIG. 1A) that amplifies and subjects to A/D conversion detection signals outputted from the first photoelectric converter 136 of the scattered light detecting optical system 130 of the front side checking optical system 1120 and a second A/D converter 152 that amplifies and subjects to A/D conversion detection signals outputted from the second photoelectric converter 146 of the specular reflection detecting optical system 140; a second A/D converting section 1142 having a third A/D converter 1281 that amplifies and subjects to A/D conversion detection signals outputted from a third photoelectric converter 1260 of the scattered light detecting system 1240 of the rear side checking optical system 1130 and a fourth A/D converter 1282 that amplifies and subjects to A/D conversion detection signals outputted from the fourth photoelectric converter 1276 of the specular reflection detecting optical system 1270; a first signal processor 1143 (corresponding to the signal processor 153 in the configuration shown in FIG. 1C) that receives and subjects to signal processing the output from the first A/D converting section 1141; a second signal processor 1144 that receives and subjects to signal processing the output from the second A/D converting section 1142; an integrated signal processor 1145 that subjects to integrated processing the signals processed by the first signal processor 1143 and those processed by the second signal processor 1144; a storage 1146 that stores the results of processing by the integrated signal processor 1145; an input/output unit 1147 that outputs the results of processing by the integrated signal processor 1145 and is provided with a display screen 1148 to which checkup conditions are inputted; an overall controller 1149 that performs overall control; a table controller 1150 that receives control signals from the overall controller 1149 and controls the table section 1110; and a checkup optical system controller 1151 that receives control signals from the overall controller 1149 and controls the front side checking optical system 1120 and the rear side checking optical system 1130.

Now, the operation of each unit in simultaneous checkup of both faces of a magnetic disk in the above-described configuration will be described.

First, the sample 100 is mounted on the table 1111 of the table section 1110 with a loading mechanism (not shown); then, in a state in which the sample 100 is chucked and held by a chucking mechanism (not shown), the table section 1110 rotates the table 1111 under the control of the table controller 1150 and at the same time shifts the stage 1112, in synchronism with the rotation of the table 1111, in a direction at a right angle to the main axis of rotation of the table 1111.

While rotating and shifting the sample 100 with the table section 1110, the first laser beam source 121 of the front side checking optical system 1120 and the second laser beam source 1231 of the rear side checking optical system 1130 under the control of the checkup optical system controller 1151 are worked to emit a laser beam each.

Since the defect checking method for on the sample 100 side of the surface 1001 in the front side checking optical system 1120 is basically the same as what is described with respect to Embodiment 1, the description will not be repeated here. Signals detected by the front side checking optical system 1120 undergo A/D conversion by the A/D converting section 1141 and are processed by the signal processor 1143 (corresponding to the signal processor 153 in FIG. 1C). The method of processing by the signal processor 1143 is the same as what is described with respect to Embodiment 1 with reference to FIG. 3 through FIG. 8B. The results of processing by the signal processor 1143 are delivered, together with positional information on defects, to the integrated processor 1145.

Next in the rear side checking optical system 1130, as shown in FIG. 13A, a laser beam emitted from the second laser beam source 1231 undergoes diameter expansion by the magnifying lens 1232, and this beam with an expanded diameter is condensed by the condensing lens 1233 into a parallel beam, which comes incident on the focusing lens 1234. The laser beam transmitted by the focusing lens 1234 is reflected by the face 1236 of the prism 1235 to undergo switching of the optical path, and focused on the rear side 1002 of the sample 100 arranged in the focal position of the focusing lens 1234.

The face 1236 of the prism 1235 is so set as to cause the reflected laser beam to come incident on the rear face 1002 of the sample 100 at a desired angle (around 30 degrees). While reflected beams (a specular reflection and scattered light) are generated from the rear face 1002 of the sample 100 irradiated with the focused laser beam, some reflected beams directed toward the third aspheric Fresnel lens 1241, which corresponds to the objective lens for condensing scattered light out of these reflected beams, come incident on the third aspheric Fresnel lens 1241 whose focal position is so disposed as to match the laser beam-irradiated position of the rear face 1002 of the sample 100, and are condensed and emitted from the third aspheric Fresnel lens 1241 as a parallel beam. On the other hand, out of the reflected beams directed toward the third aspheric Fresnel lens 1241, the specular reflection is reflected by the mirror 1243 arranged ahead of the third aspheric Fresnel lens 1241 and undergoes switching of the optical path, but does not come incident on the third aspheric Fresnel lens 1241.

The scattered light from the rear face 1002 of the sample 100 which have come incident on the third aspheric Fresnel lens 1241 and been condensed into a parallel beam come incident the fourth aspheric Fresnel lens 1242 and, after being transmitted by the fourth aspheric Fresnel lens 1242, are reflected by the face 1237 of the prism 1235, undergo switching of the optical path, and are focused on the focal position of the fourth aspheric Fresnel lens 1242. The angle of the face 1237 of the prism 1235 is so set as to have the optical path switched to a direction desirable for the reflected scattered light (a direction parallel to the rear face 1002 of the sample 100). To add, in this embodiment, the rear side illuminating system is so set as to cause the laser beam emitted from the second laser beam source 1231 to travel in parallel to the rear face 1002 of the sample 100 until it reaches the face 1236 of the prism 1235, and the face 1236 and the face 1237 are set to the same angle of inclination. Both the face 1236 and the face 1237 of the prism 1235 may as well be formed of a mirror.

The pinhole plate 1251 is arranged in the focal position of the fourth aspheric Fresnel lens 1242, and the pinhole 1252 is bored therein to allow scattered light from the sample having focused in the focal position to pass. On the other hand, since most of other beams than the scattered light (reflected beams from the prism 1235 or other optical components, namely stray beams) cannot pass the pinhole 1252 but are intercepted by the pinhole plate 1251, most of the beams detected by the third photoelectric converter 1260 become scattered light from the rear face 1002 of the sample 100 having passed the pinhole 1252.

Signals obtained by detection of scattered light from the rear face 1002 of the sample 100 by the third photoelectric converter 1260 are inputted to the A/D converter 1281 of the A/D converting section 1141 and, after being converted into digital signals and amplified, inputted to the rear side detection signal processor 1144.

On the other hand, the specular reflection from the sample 100, reflected by the mirror 1243, having undergone switching of the optical path and entered the rear side specular reflection detecting optical system 1270 is detected by the fourth photoelectric converter 1276. The detection signal of the specular reflection detected by the fourth photoelectric converter 1276 is inputted to the A/D converter 1282 of the A/D converting section 1142 and, after being amplified and converted into a digital signal, is inputted to the rear side detection signal processor 1144.

Each of the detection signal from the third photoelectric converter 1260 and the detection signal from the fourth photoelectric converter 1276 inputted to the rear side detection signal processor 1144 is processed in the same way as the earlier described processing by the front side detection signal processor 1143 (corresponding to the signal processor 153 in Embodiment 1) to have any defect on the rear face 1002 of the sample 100 detected, the type and size of the defect are determined, and the results of determination, together with positional information on the defect, are delivered to the integrated processor 1145.

As this embodiment enables a high NA detecting optical system to be compactly configured by combining aspheric Fresnel lenses, it has been made possible to detect any minute defects on both sides of the disk at the same time without requiring a larger apparatus.

Data processed by the front side detection signal processor 1143 and the rear side detection signal processor 1144 are delivered to and processed by the integrated processor 1145, and the processed data are delivered to and stored into the storage 1146 as two-face defect information on the sample 100. These data are also delivered to the input/output unit 1147, which outputs checkup result information on the screen 1148.

Figure 14:
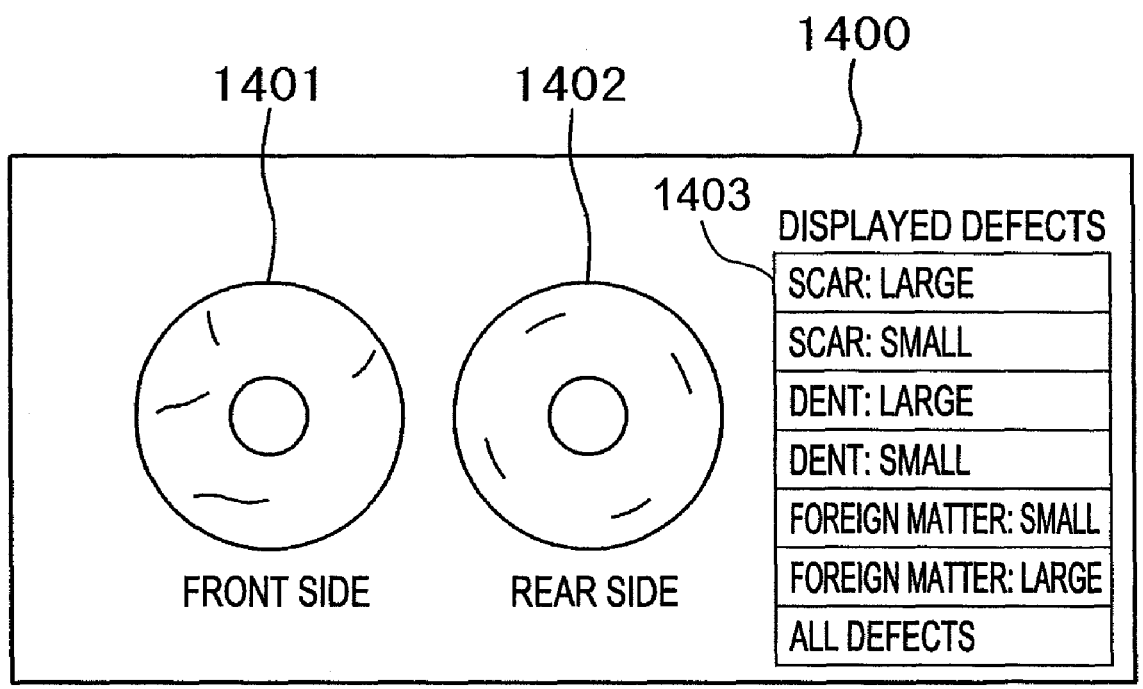
FIG. 14 shows a display screen mapping the result of checkup in Embodiment 2.

An example of information on checkup results outputted by the output unit 1147 in this Embodiment 2 is shown in FIG. 14. In this example of a screen 1400, a distribution 1401 of defects detected on the front side of the sample 100 classified by type and a distribution 1402 of defects detected on the rear side of the same also classified by type are mapped, accompanied beside by a defect list 1403. The user can, by designating any desired defect type on the defect list 1403, visually grasp the states of the distribution 1401 on the front side and the distribution 1402 on the rear side regarding defects of the designated type.

While the configuration of the display screen shown in FIG. 14 is substantially the same as that of the display screen in Embodiment 1 described with reference to FIG. 9, as the front face 1001 and the rear face 1002 of the sample 100 are checked at the same time in this Embodiment 2, it is made possible to know the relative positional relationships between defects detected on the front face 1001 and defects detected on the rear face 1002, which can be used as useful information in managing the manufacturing process.

The invention may be embodied in other specific forms without departing from the spirit or essential characteristics thereof. The present embodiments are therefore to be considered in all aspects as illustrative and not restrictive, the scope of the invention being indicated by the appended claims, rather than by the foregoing description, and all changes which come within the meaning and range of equivalency of the claims are therefore intended to be embraced therein.

What is claimed is:

1. An apparatus for optically checking defects in magnetic disks, comprising:
    a table device capable of holding a magnetic disk to be checked and rotating and shifting the disk;
    an illuminating device that irradiates a surface of the magnetic disk held by the table device with a laser beam;
    a specular reflection detecting device that detects a specular reflection out of reflected beams from the surface of the magnetic disk irradiated with a laser beam by the illuminating device;
    a scattered light detecting device that detects scattered light out of reflected beams from the surface of the magnetic disk irradiated with a laser beam by the illuminating device;
    a processing device that processes detection signals obtained by detection of the specular reflection by the specular reflection detecting optical device and detection signals obtained by detection of the scattered beams by the scattered beam detecting optical device to extract any defect on the magnetic disk;
    an output device that outputs results of processing by the processing device; and
    a control device that controls the table device, the illuminating device, the specular reflection detecting device, the scattered light detecting device and the processing device,
    wherein the specular reflection detecting device has a detector having a detecting face on which a plurality of pixels are arrayed, the control device, when causing the magnetic disk to make one turn by controlling the table device, consecutively shifts the magnetic disk in a radial direction so as to make a checkup area of the magnetic disk to be detected by the detector of the detecting device adjoin in the radial direction the checkup area of one turn before, and the processing device figures out the position of each defect by using, in addition to an output signal from each of the pixels having detected the specular reflection from the checkup area of the magnetic disk, also the output signals of some pixels out of the plurality of pixels having detected a specular reflection from the checkup area of one turn before and the checkup area of one turn after, both adjoining in the radial direction, and determines the type of the defect.

2. The apparatus for optically checking defects in magnetic disks according to claim 1, wherein the processing device figures out the position of the center of gravity of each output signal by using, in addition to the output signal from each of the pixels having detected the specular reflection from the checkup area of the magnetic disk, also the output signals of some pixels out of the plurality of pixels having detected a specular reflection from the checkup area of one turn before and the checkup area of one turn after, both adjoining in the radial direction, and determines the convexity/concaveness of the defect by comparing a level of the output signal of the pixel in the figured-out position of the center of gravity with a reference signal level.

3. The apparatus for optically checking defects in magnetic disks according to claim 1, wherein the processing device figures out the position of the center of gravity of each output signal in the checkup area at the time of the checkup by using, in addition to the output signal from each of the pixels having detected the specular reflection from the checkup area of the magnetic disk, also the output signals of some pixels out of the plurality of pixels having detected a specular reflection from, a checkup area irradiated with the laser beam at the time of the checkup, out of the checkup area of one turn before and the checkup area of one turn after, both adjoining in the radial direction.

4. The apparatus for optically checking defects in magnetic disks according to claim 1, wherein the processing device determines whether the defect existing in the checkup area is an isolated defect or consecutive defects on the basis of the output signal from each of the pixels having detected the specular reflection from the checkup area of the magnetic disk, figures out, if the defect is determined to be isolated, the central position of the defect by using, in addition to the output signal from each of the pixels having detected the specular reflection from the checkup area, also the output signals of some pixels out of the plurality of pixels having detected the specular reflection from the checkup area of one turn before and the checkup area of one turn after, both adjoining in the radial direction, and determines the convexity/concaveness of the isolated defect by comparing the level of the output signal of the pixel in the figured-out central position with the reference signal level.

5. The apparatus for optically checking defects in magnetic disks according to claim 1, wherein the scattered light detecting device has a first aspheric lens that condenses scattered light from the laser beam-irradiated magnetic disk, a second aspheric lens that focuses the scattered light condensed by the first aspheric lens, a pinhole plate having a pinhole that is arranged in the position where the scattered light are focused by the second aspheric lens and passes the focused scattered light, and a detector that receives the scattered light having passed the pinhole.

6. An apparatus that optically checks any defect on a front face and a rear face of a magnetic disk at the same time, comprising:
   a table device capable of holding a magnetic disk to be checked and rotating and shifting the disk;
   an integrated signal processor that has a front face defect detector for detecting any defect on the front face of the magnetic disk and a rear face defect detector for detecting any defect on the rear face of the magnetic disk, and outputs in an integrated manner any defect on the front face and the rear face of the magnetic disk by using a result of detection by the front face defect detector and a result of detection by the rear face defect detector; and
   a control device that controls the table device, the front face defect detector, the rear face defect detector and the integrated signal processor,
   wherein the front face defect detector and the rear face defect detector respectively include:
   an illuminating device that irradiates the surface of the magnetic disk held by the table device with a laser beam;
   a specular reflection detecting device that detects a specular reflection out of reflected beams from the surface of the magnetic disk irradiated with a laser beam by the illuminating device;
   a scattered light detecting device that detects scattered light out of out of reflected beams from the surface of the magnetic disk irradiated with a laser beam by the illuminating device; and
   a processing device that processes detection signals obtained by detection of the specular reflection by the specular reflection detecting optical device and detection signals obtained by detection of the scattered light by the scattered light detecting optical device to extract any defect on the magnetic disk,
   wherein the specular reflection detecting device has a detector having a detecting face on which a plurality of pixels are arrayed, the control device, when causing the magnetic disk to make one turn by controlling the table device, consecutively shifts the magnetic disk in a radial direction so as to make a checkup area of the magnetic disk to be detected by the detector of the detecting device adjoin in the radial direction the checkup area of one turn before, and the processing device figures out the position of each defect by using, in addition to an output signal from each of the pixels having detected the specular reflection from the checkup area of the magnetic disk, also the output signals of some pixels out of the plurality of pixels having detected a specular reflection from the checkup area of one turn before and the checkup area of one turn after, both adjoining in the radial direction, and determines the type of the defect.

7. The apparatus that optically checks any defect on a front face and a rear face of a magnetic disk at the same time according to claim 6, wherein the processing device figures out the position of the center of gravity of each output signal by using, in addition to the output signal from each of the pixels having detected the specular reflection from the checkup area of the magnetic disk, also the output signals of some pixels out of the plurality of pixels having detected a specular reflection from the checkup area of one turn before and the checkup area of one turn after, both adjoining in the radial direction, and determines the convexity/concaveness of the defect by comparing a level of the output signal of the pixel in the figured-out position of the center of gravity with a reference signal level.

8. The apparatus that optically checks any defect on a front face and a rear face of a magnetic disk at the same time according to claim 6, wherein the processing device figures out the position of the center of gravity of each output signal in the checkup area at the time of the checkup by using, in addition to the output signal from each of the pixels having detected the specular reflection from the checkup area of the magnetic disk, also the output signals of some pixels out of the plurality of pixels having detected a specular reflection from, a checkup area irradiated with the laser beam at the time of the checkup, out of the checkup area of one turn before and the checkup area of one turn after, both adjoining in the radial direction.

9. The apparatus that optically checks any defect on a front face and a rear face of a magnetic disk at the same time according to claim 6, wherein the processing device determines whether the defect existing in the checkup area is an isolated defect or consecutive defects on the basis of the output signal from each of the pixels having detected the specular reflection from the checkup area of the magnetic disk, figures out, if the defect is determined to be isolated, the central position of the defect by using, in addition to the output signal from each of the pixels having detected the specular reflection from the checkup area, also the output signals of some pixels out of the plurality of pixels having detected the specular reflection from the checkup area of one turn before and the checkup area of one turn after, both adjoining in the radial direction, and determines the convexity/concaveness of the isolated defect by comparing the level of the output signal of the pixel in the figured-out central position with the reference signal level.

10. The apparatus that optically checks any defect on a front face and a rear face of a magnetic disk at the same time according to claim 6, wherein the scattered light detecting device has a first aspheric lens that condenses scattered beams from the laser beam-irradiated magnetic disk, a second aspheric lens that focuses the scattered light condensed by the first aspheric lens, a pinhole plate having a pinhole that is arranged in the position where the scattered light are focused by the second aspheric lens and passes the focused scattered light, and a detector that receives the scattered light having passed the pinhole.

11. A method of optically checking defects in magnetic disks, comprising the steps of:
   irradiating a surface of a magnetic disk held by a table permitting rotation and shifting with a laser beam;
   separately detecting specular reflection and scattered light out of reflected beams from the surface of the laser beam-irradiated magnetic disk;
   processing a detection signal of the specular reflection and a detection signals of the scattered light that are separately detected, extracting defects on the magnetic disk; and
   outputting results of processing,
   wherein a specular reflection from the surface of the magnetic disk is detected with a detector having a detecting face on which a plurality of pixels are arrayed, and while consecutively shifting the magnetic disk in a radial direction so as to make a checkup area of the magnetic disk to be detected by the detector adjoin in the radial direction the checkup area of one turn before when the magnetic disk has been caused to make one turn, the position of each defect is figured out by using, in addition to an output signal from each of the pixels having detected the specular reflection from the checkup area of the magnetic disk, also the output signals of some pixels out of the plurality of pixels having detected a specular reflection from the checkup area of one turn before and the checkup area of one turn after, both adjoining in the radial direction, and then the type of the defect is determined.

12. The method of optically checking defects in magnetic disks according to claim 11, wherein figuring out the position of the defect is accomplished by figuring out the position of the center of gravity of each output signal by using, in addition to the output signal from each of the pixels having detected the specular reflection from the checkup area of the magnetic disk, also the output signals of some pixels out of the plurality of pixels having detected a specular reflection from the checkup area of one turn before and the checkup area of one turn after, both adjoining in the radial direction, and determining the convexity/concaveness of the defect by comparing a level of the output signal of the pixel in the figured-out position of the center of gravity with a reference signal level.

13. The method of optically checking defects in magnetic disks according to claim 11, wherein the position of the center of gravity of each output signal in the checkup area at the time of the checkup is figured out by using, in addition to the output signal from each of the pixels having detected the specular reflection from the checkup area of the magnetic disk, also the output signals of some pixels out of the plurality of pixels having detected a specular reflection from, a checkup area irradiated with the laser beam at the time of the checkup, out of the checkup area of one turn before and the checkup area of one turn after, both adjoining in the radial direction.

14. The method of optically checking defects in magnetic disks according to claim 11, wherein whether the defect existing in the checkup area is an isolated defect or consecutive defects is determined on the basis of the output signal from each of the pixels having detected the specular reflection from the checkup area of the magnetic disk; if the defect is determined to be isolated, the central position of the defect is figured out by using, in addition to the output signal from each of the pixels having detected the specular reflection from the checkup area, also the output signals of some pixels out of the plurality of pixels having detected the specular reflection from the checkup area of one turn before and the checkup area of one turn after, both adjoining in the radial direction; and the convexity/concaveness of the isolated defect is determined by comparing the level of the output signal of the pixel in the figured-out central position with the reference signal level.

15. The method of optically checking defects in magnetic disks according to claim 11, wherein a specular reflection and scattered light out of reflected beams from the checkup area of the laser beam-irradiated magnetic disk are separated, the separated scattered light are condensed by a first aspheric lens, the scattered light condensed by the first aspheric lens are focuses by a second aspheric lens and caused to pass a pinhole, and the scattered light having passed the pinhole are received by a detector.

16. A method of optically checks any defect on a front face and a rear face of a magnetic disk at the same time, comprising the steps of:
irradiating each of a front face and a rear face of a magnetic disk held by a table permitting rotation and shifting with a laser beam;
extracting any defect in the front face of the magnetic disk by processing a signal of detecting specular reflection and signals of detecting scattered light from the front face of the laser beam-irradiated magnetic disk;
extracting any defect in the rear face of the magnetic disk by processing a signal of detecting a specular reflection and signals of detecting scattered light from the rear face of the laser beam-irradiated magnetic disk; and
outputting in an integrated manner results of extracting any defect in the front face of the magnetic disk and results of extracting any defect in the rear face of the magnetic disk,
wherein extraction of defects in the front face of the magnetic disk and extraction of defects in the rear face of the magnetic disk are accomplished by:
separately detecting the specular reflection and the scattered light out of the reflected beams from the laser beam-irradiated magnetic disk; detecting the separated specular reflection with a detector having a detecting face on which a plurality of pixels are arrayed; while consecutively shifting the magnetic disk in a radial direction so as to make a checkup area of the magnetic disk to be detected by the detector adjoin in the radial direction the checkup area of one turn before when the magnetic disk has been caused to make one turn, figuring out the position of each defect by using, in addition to an output signal from each of the pixels having detected the specular reflection from the checkup area of the magnetic disk, also the output signals of some pixels out of the plurality of pixels having detected a specular reflection from the checkup area of one turn before and the checkup area of one turn after, both adjoining in the radial direction; and determining the type of the defect.

17. The method of optically checks any defect on a front face and a rear face of a magnetic disk at the same time according to claim 16, wherein figuring out the position of the defect is accomplished by figuring out the position of the center of gravity of each output signal by using, in addition to the output signal from each of the pixels having detected the specular reflection from the checkup area of the magnetic disk, also the output signals of some pixels out of the plurality of pixels having detected a specular reflection from the checkup area of one turn before and the checkup area of one turn after, both adjoining in the radial direction, and determining the convexity/concaveness of the defect by comparing a level of the output signal of the pixel in the figured-out position of the center of gravity with a reference signal level.

18. The method of optically checks any defect on a front face and a rear face of a magnetic disk at the same time according to claim 16, wherein the position of the center of gravity of each output signal in the checkup area at the time of the checkup is figured out by using, in addition to the output signal from each of the pixels having detected the specular reflection from the checkup area of the magnetic disk, also the output signal of some pixels out of the plurality of pixels having detected a specular reflection from a checkup area irradiated with the laser beam at the time of the checkup, out of the checkup area of one turn before and the checkup area of one turn after, both adjoining in the radial direction.

19. The method of optically checks any defect on a front face and a rear face of a magnetic disk at the same time according to claim 16, wherein whether the defect existing in the checkup area is an isolated defect or consecutive defects is determined on the basis of the output signal from each of the pixels having detected the specular reflection from the checkup area of the magnetic disk; if the defect is determined to be isolated, the central position of the defect is figured out by using, in addition to the output signal from each of the pixels having detected the specular reflection from the checkup area, also the output signals of some pixels out of the plurality of pixels having detected the specular reflection from the checkup area of one turn before and the checkup area of one turn after, both adjoining in the radial direction; and the convexity/concaveness of the isolated defect is determined by comparing the level of the output signal of the pixel in the figured-out central position with the reference signal level.

20. The method of optically checks any defect on a front face and a rear face of a magnetic disk at the same time according to claim 16, wherein a specular reflection and scattered light out of reflected beams from the checkup area of the laser beam-irradiated magnetic disk are separated, the separated scattered light are condensed by a first aspheric lens, the scattered light condensed by the first aspheric lens are focused by a second aspheric lens and caused to pass a pinhole, and the scattered light having passed the pinhole are received by a detector.

* * * * *